United States Patent [19]

Krause et al.

[11] Patent Number: 4,945,550

[45] Date of Patent: Jul. 31, 1990

[54] ATCRBS/SIF/TCAS REPLY DECODER

[75] Inventors: William E. Krause, Timonium; Norman R. Sanford, Cockeysville, both of Md.

[73] Assignee: Allied-Signal Inc., Morris Township, N.J.

[21] Appl. No.: 334,890

[22] Filed: Apr. 7, 1989

[51] Int. Cl.$^5$ .............................................. H03K 5/14
[52] U.S. Cl. ...................................... 375/94; 328/119; 342/40
[58] Field of Search ............................ 375/94, 96, 116; 328/108, 119; 340/825.54, 825.57, 825.61, 825.62, 825.68; 342/40, 42, 44; 370/92, 93; 364/724.11

[56] References Cited

U.S. PATENT DOCUMENTS

| | | | |
|---|---|---|---|
| 2,719,188 | 9/1955 | Pierce | 370/93 |
| 4,063,220 | 12/1977 | Metcalfe et al. | 370/93 |
| 4,241,310 | 12/1980 | Kerr | 328/119 |

Primary Examiner—Benedict V. Safourek
Attorney, Agent, or Firm—Howard G. Massung; Robert A. Walsh

[57] ABSTRACT

A decoder for separating pulse code modulated messages of the type used in ATCRBS where the messages are identified by two framing pulses separated by 20.3 us. and contain information pulses between the framing pulses separated from the framing pulses and from one another by 1.45 us. The decoder receives an input stream of pulses of uniform width from a Leading Edge Detector which has created the stream from video pulses received from the transmitter of another station. The decoder input pulse stream may contain interleaved pulses from more than one message. The decoder includes an input shift register, an analysis shift register, a plurality of buffer storage devices and additional registers to which selected pulses are fed from the input register for use in determining whether a received message is clear of interfering pulses or whether the message is potentially or actually garbled. The input pulse stream is passed through the input register into the analysis register where the framing pulses enable the loading into buffer storage of the information pulses associated with the framing pulses. Pulses in the analysis register at the time a message is loaded into buffer storage and not included in the message loaded may be included in a message later loaded in a second buffer storage device. Means are provided for comparing the messages retained in buffer storage with messages currently being loaded into buffer storage to determine whether garbling exists between the several messages.

18 Claims, 10 Drawing Sheets

ATCRBS/SIF/TCAS REPLY DECODER

BACKGROUND OF THE INVENTION

The present invention relates to an improved reply decoder of the digital delay line type for Pulse Code Modulation (PCM) decoder service in Air Traffic Control Radar Beacon Systems/Selective Identification Feature (ATCRBS/SIF) and in Traffic Alert and Collision Avoidance Systems (TCAS).

Considering the large number of ATCRBS/SIF interrogators in many metropolitan areas, the large number of aircraft that will carry interrogating TCAS equipment in the near future, and the typically large number of transponder-equipped aircraft that are within operational range of one or more of these interrogators, a large number of replies will be received by each interrogator station. Only those valid responses to a particular interrogation are of interest to the respective interrogator; other replies, known as False Replies Unsynchronized In Time (FRUIT), cause a major reply processing problem for the associated computer, and this problem becomes acute in high reply-density areas.

Hardware means are included in reply decoders, and software means in reply processors, to minimize such FRUIT interference; but these means can not be substantially effective when "garbled" replies exist, i.e., where two more more replies arrive at the interrogator receiver at approximately the same time. Detection and degarbling of overlapping replies is a second major problem of reply decoders Obviously, it is desirable to eliminate reply garbling without losing valid replies.

The reply format inherent in the ATCRBS/SIF reply modes include one leading and one trailing framing pulse, with said pulses being separated by 20.3 microseconds. Valid reply pulse trains are recognized by this spacing between framing pulses. Up to 13 data pulses, spaced at 1.45 us. intervals between the framing pulses, are synchronized for decoding based upon the time of the initial framing pulse. This function is accomplished in the reply decoder by a bracket decoder circuit on the digital delay line. In addition to these normal replies, an individual aircraft pilot may select special replies: e.g., the trailing framing pulse may be followed at 4.35 us. by a Special Position Identification (SPI) pulse in modes 2 and 3/A, or by three subsequent pairs of framing pulses (with each leading framing pulse 4.35 us. after the trailing framing pulse of the previous pair) to indicate a military emergency. Mode 1 SPI is indicated by a repeated pair of framing pulses with the first spaced 4.35 us., after the trailing framing pulse of the initial reply.

Under conditions of heavy reply rates, the probability becomes high that replies will be overlapped, interleaved, or closely spaced and in time alignment. Hardware means of deriving leading and trailing edges of reply pulses and then deducing the correct position of these reply pulses will reduce these effects because narrow pulses can more easily be separated.

Copending application Ser. No. 332,135, filed Apr. 3, 1989, titled "Leading Edge Detector/Pulse Quantizer" by N. Sanford, R. Yienger and B. J. Lyons describes an improved means for separating interfering reply messages into a pulse data stream containing only pulses 125 ns. in length, with each pulse separated by a minimum of 125 ns. and with the leading edge of each pulse positioned in the data stream according to the relative time of its reception at the interrogating station. The output data stream is termed "Sum Leading Edge (SLE)".

The described reply format gives rise to the third problem plaguing reply decoders and processors. "Phantom" replies appear in the reply decoder output whenever any two pulses arrive at the reply decoder with the same time separation between them (20.3 microseconds) as the two framing pulses of a valid reply. This problem can arise when two different aircraft each respond to the same interrogation signal at substantially the same time and two reply messages arrive at the interrogation station in overlapping relationship such that a data pulse contained in the first reply message and a data pulse contained in the second reply message are by fortuitous circumstance spaced apart 20.3 us.

Early beacon reply decoders usually operating on the unprocessed video output of the system receiver either declared all bracket-decoded replies which satisfied the bracket pair time-spacing criteria of 20.3 us., or else declared all nongarbled bracket decodes. The logic circuits for detecting garble either detected leading or trailing bracket decodes which were overlapped and in sufficiently close time proximity to make the code bits of the bracket pair under analysis questionable otherwise they simply looked for pulses in time aligned slots (multiples of 1.45 us.) either before or after the bracket pair. If the reply decoder had been set to declare all bracket decodes, it would tend to overload the associated computer, because two closely spaced replies, in combination, can generate as many as 13 bracket decodes of which two would be real but the remainder phantoms. Conversely, if only nongarbled replies were to be reported, then no replies would be reported in this situation.

U.S. Pat. No. 4,241,310, issued Dec. 23, 1980, titled "Delay Line Code Detector" by Leo A. Kerr describes a decoder for a pulse code communications system of the type here involved which utilizes a 100-us. digital delay line in conjunction with leading edge pulse detection, to allow detection of two closely spaced replies in time alignment. Phantoms produced between the pair of replies were discarded. The two replies would be declared as not garbled if not overlapped; otherwise they would be declared garbled.

The Kerr decoder also handles three closely spaced replies, invariably declaring the first and third replies as not garbled if they were not overlapped with the middle reply. It also declares the middle reply as not garbled if that reply was not overlapped with either the first or third replies and provided that data pulses were not incorporated in both leading and trailing phantom bracket decodes. If either condition existed, the reply would not be declared at all. This method represented a substantial improvement over earlier decoding methods in that, even in the garbled reply detection mode, it eliminated any possibility of phantom reply declaration.

The Kerr decoder had certain deficiencies. First, in elimination of phantom replies, it also eliminated middle replies of a group of three closely spaced and time-aligned replies where the center reply had data pulses present which created both leading and trailing phantom bracket decodes.

A second deficiency of the Kerr decoder was that, in the event of three overlapped replies which are also in time alignment, it would invariably declare the first and third replies as nongarbled, even though they were likely to be garbled and does not declare the middle reply.

An improved version of the referenced Kerr decoder developed for the TCAS program is described in a report titled "Simulation of Enhanced TCAS-II Signal Processor Hardware Design", pp. 2-17 through 2-35; J. Lyons and M. Martin, authors; Report No. BCD-TR-092, dated Feb. 29, 1984; prepared and available to the public through National Technical Information Service, Springfield, VA 22161.

The TCAS decoder also employs a 100-us. digital delay line, but with improved combinational logic which processes closely spaced time-aligned reply situations more accurately.

Both the Kerr decoder and the TCAS decoder were designed for civil aviation use. To provide for military emergency decoding, shift registers would have to be extended an additional 33.3 us. to allow time for decoding the three trailing bracket decodes which comprise a military emergency reply. At the 8.276 MHz clock rate used in the TCAS decoder, more than 840 flip-flop elements are needed for normal replies. With an additional 280 flip-flop needed to decode and validate military emergency replies, these implementations would require a total of more than 1100 elements in their shift registers. Further, both implementations used parallel combinational logic operating from one-fourth of the stages distributed across the whole shift register, so that formidable amounts of combinational logic and interconnection would be required for military applications.

SUMMARY OF THE INVENTION

The present invention builds upon the foundation of cited prior art and incorporates additional improvements to further improve reply decoders for functioning in the high-traffic scenarios which are becoming typical in the air traffic control environment.

The decoder of the invention processes reply messages, which have been resolved into a Sum Leading Edge (SLE) data stream by a Leading Edge Detector/Pulse Quantizer of the type described in the above-referenced Sanford, Yienger and Lyons application, to identify the particular pulses contained in the SLE data stream which comprise valid framing pulses, both for ATCRBS and military SIF replies, and thereby segregate the data pulses contained within such framing pulses into valid reply messages. In the terminology used hereinafter, the decoder "declares a reply" when such valid framing pulses are identified.

The decoder of the invention further includes means for assessing the quality of "declared replies". When the SLE input data stream contains pulses so spaced that two sets of framing pulses can be identified and these sets of framing pulses result in two reply messages which are time-aligned and overlapped, the reply is "declared garbled". If sets of framing pulses are identified and the time relationship between the sets is such that one or more of the data pulses within one set of framing pulses could belong to the data of another set, the reply is "declared potentially garbled".

The main elements of the invention comprise two dual function shift registers (DFSR) and a buffer-sequencer (BUSEQ) having ten storage stages.

Each of the BUSEQ elements stores a reply for a period of approximately 50 us., during which time final determination of reply quality is performed and military emergency trains are validated. Each BUSEQ element contains enough storage for the 13-bit reply code maximum, plus SPI bit, second train bit (BST), military emergency train bit (BET), and a 2-bit quality status byte which indicates overlap and time coincidence with any previously or subsequently declared reply. If a subsequently declared reply occurs in time coincidence with the earlier reply, both replies are then declared as garbled.

After a time delay long enough to determine the presence of a military emergency train, the reply will be unloaded into a common parallel output data bus which is shared by all BUSEQ elements. A data strobe signal is simultaneously output to load the declared reply data into a FIFO or other data buffer device for acquisition by the associated Reply Processor.

A second feature of the present invention is the use of a nonrelated data register to keep track of whether or not data has been related to, and therefore loaded as part of, a previously declared reply; and the use of combinational logic to determine whether or not subsequent bracket decodes could account for any nonrelated data included in a bracket decode which is being considered for declaration as a reply. This enables the decoder to declare a better percentage of valid replies than the prior TCAS decoder while simultaneously decoding fewer false bracket decodes.

In the process of evaluating reply quality, quality is also enhanced by loading only those new replies which contain at least one bit which had not been included in previously loaded replies and which could not possibly belong to a later (trailing) bracket decoded reply. Implementation of this nonrelated data concept greatly reduces the number of replies to be declared and stored in buffers and FIFO, and to be processed in the associated Reply Processor. Equally as important, this method ensures against loss of unique data bits.

A third feature of the present invention is the use of a bracket decode storage register and a bit adder combinational logic network to determine an intermediate level of reply quality, "potentially garbled". A reply is assigned this quality if it is not overlapped and in time coincidence with another declared reply, but has data bits which may be assigned to more than one bracket decode (multiple-use bits), regardless of whether the other bracket decode is a phantom or a declared reply. The underlying hypothesis in this multiple-use bit (MUB) method of evaluating reply quality status is the assumption that where an individual data bit is time-aligned $(+/-1$ clock) to more than one bracket decode, an overlap condition may exist.

It should be noted that, when C2 data pulse/SPI condition is present, multiple-use bits (MUBS) will be generated for the C2 bit and any other bits present between the C2 and F2 pulses. So, for the C2/SPI cases, the quality evaluation logic reverts to detection of Trailing Bracket Decodes (TBD) to detect shared replies for those bits between the C2 and SPI bits while continuing to check for MUBs for those bits preceding C2. The assignment of the potentially garbled quality status to C2/SPI replies allows improved reply code validation by the Reply Processor to which the reply data is forwarded.

It is an object of the present invention to provide a reply decoder which analyzes all reply pulses present in the datastream, and temporarily stores each reply train—provided that it contains at least one data pulse which could not possibly be related to another—either earlier or later—reply.

It is a further object of this invention to evaluate reply quality based upon the uniqueness of the data pulses which it contains, and to allow control, by the associated Reply Processor, of minimum acceptable reply quality.

Through study the following description of the preferred embodiment and the accompanying drawings, these and other objects of the present invention will become apparent to those who are skilled in the art.

DESCRIPTION OF THE PREFERRED EMBODIMENT

Figure 1:
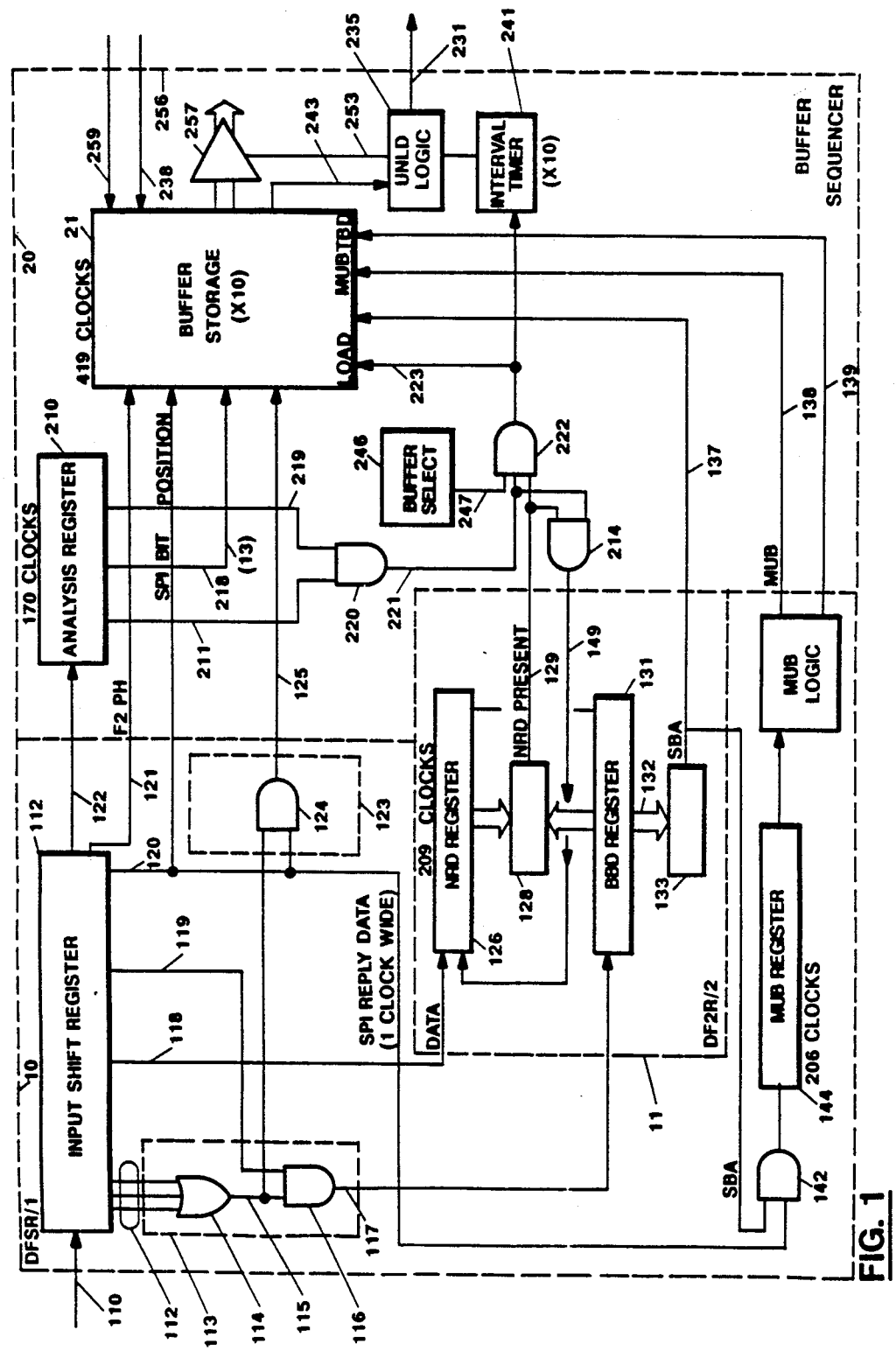
FIG. 1 is an overall functional block diagram of the ATCRBS/SIF/TCAS reply decoder.
Figure 2:
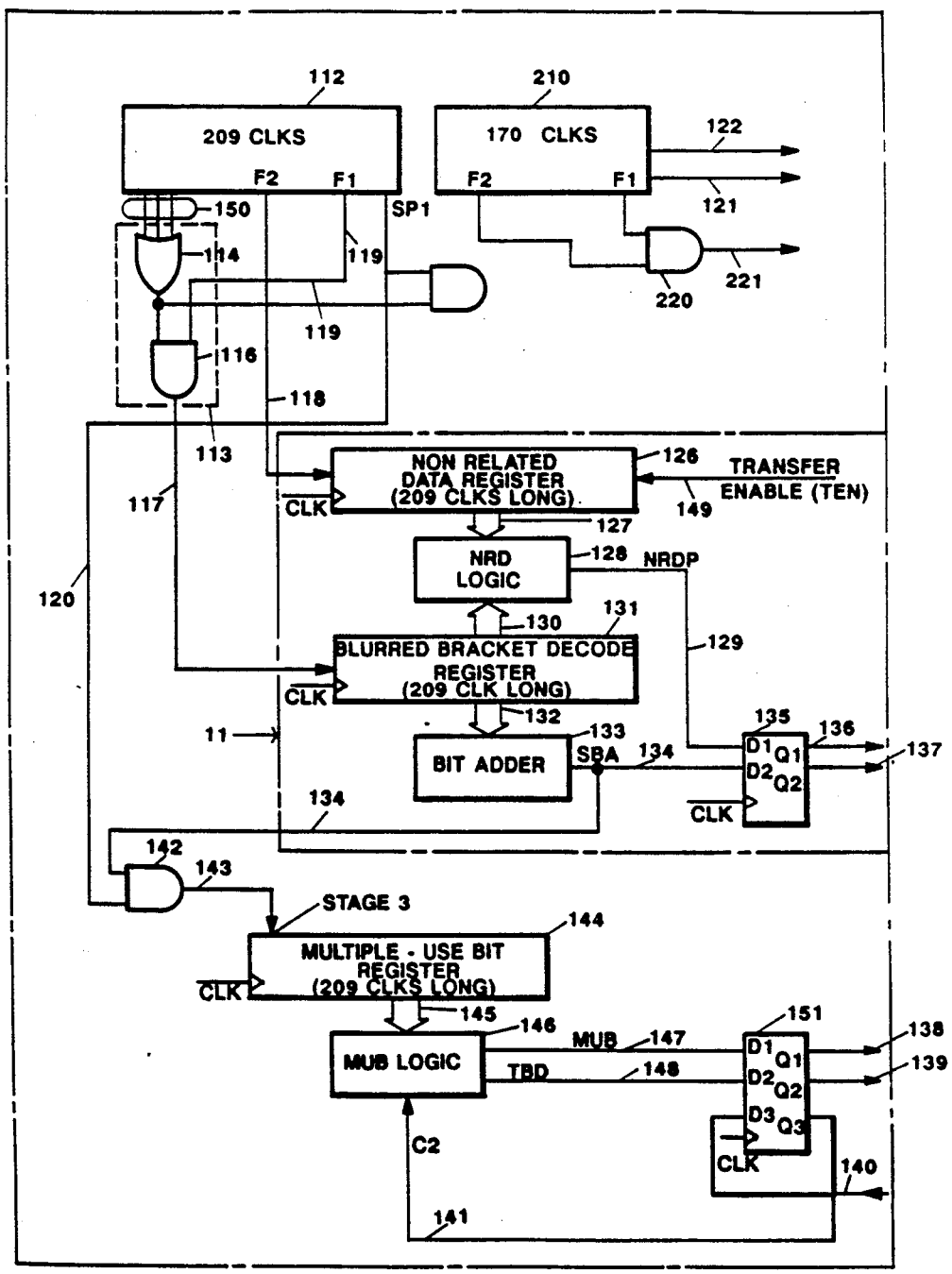
FIG. 2 is a functional block diagram of the Dual-Function Shift Registers 10 and 11 shown in FIG. 1.
Figure 3:
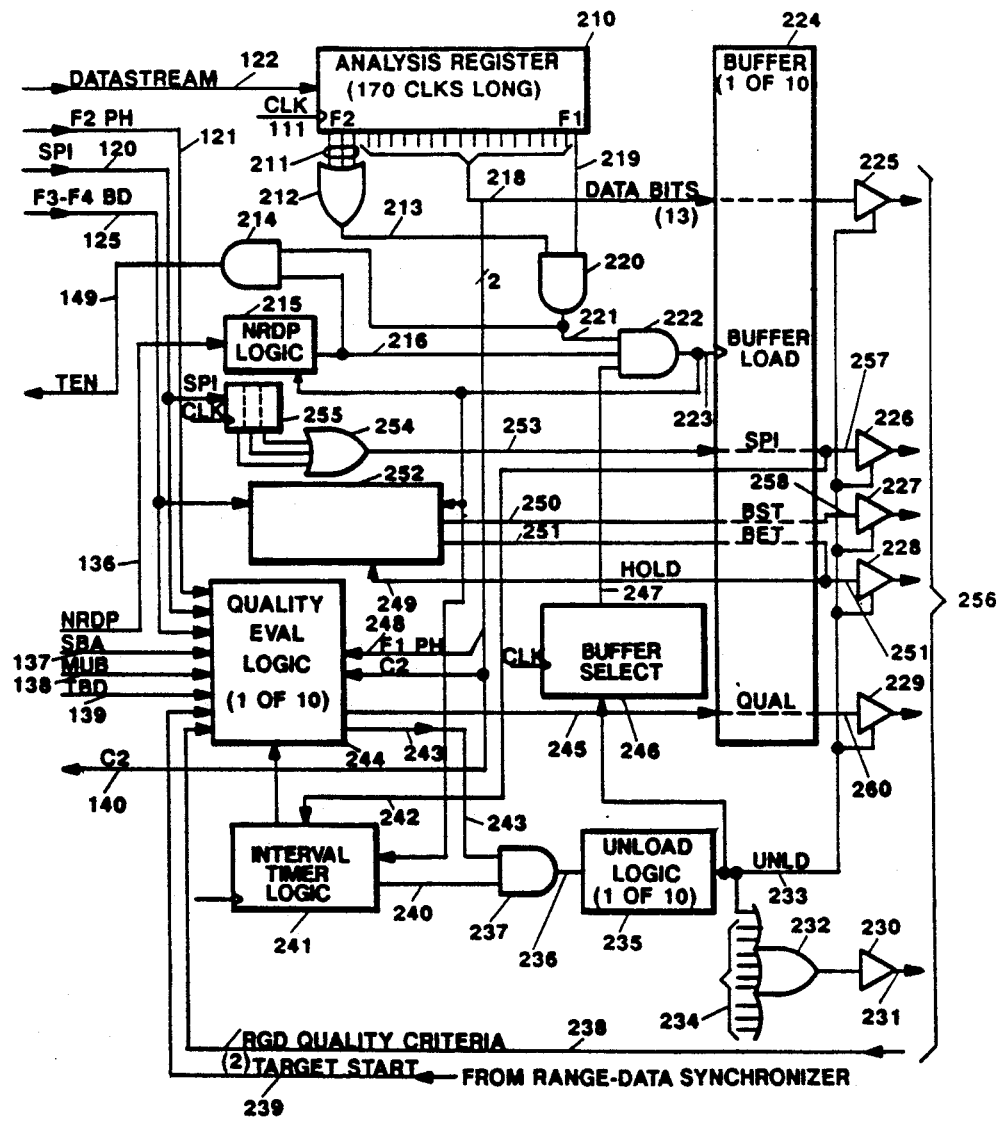
FIG. 3 is a functional block diagram of the Buffer-Sequencer, 20, shown in FIG. 1.

Referring to FIG. 1, the two identical Dual-Function Shift Register (DFSR) chips are used in functionally different but complementary roles, together with Buffer-Sequencer (BUSEQ). FIG. 1 is an overall block diagram of the present invention. FIG. 2 shows the DFSRs in more detail, while FIG. 3 shows the Buffer-Sequencer. In the preferred embodiment, the BUSEQ can be two chips with 5 storage buffers each, or one chip with 10 storage buffers. The use of 10 buffer elements has been mathematically demonstrated to operate satisfactorily, with minimal loss of replies, in an environment of jamming and/or extremely high traffic density; however, any other quantity of these elements could be employed. In applications where traffic density is low, 5 buffers would be an adequate quantity.

Referring to FIG. 2, DFSR #1 block 10, performs the following functions:

a. Provides temporary storage in input register 112, for ATCRBS/SIF reply trains present in sum leading edge (SLE) datastream input 110.

b. Outputs a delayed leading edge datastream 122 to the BUSEQ.

c. Emergency train decode logic 123 bracket-decodes (BD) military emergency framing pulse pair F3 and F4 and forwards this BD, subsequently followed by F5-F6, then F7-F8 BDs, to BUSEQ via line 125.

d. Outputs a 3-clock-wide blurred bracket-decode (BBD) signal 117 to BBD register 131.

e. Decodes SPI bit 120 and forwards it to the BUSEQ.

f. Stores multiple-use bits in MUB register 144; reclocks and outputs MUB signal 138 to BUSEQ.

g. Outputs a delayed datastream 118 to the nonrelated data (NRD) register 126.

h. Decodes a F2 phantom signal 121 (related to F3-F4 bracket decode 125) and forwards this bit to BUSEQ.

Referring again to FIG. 2, DFSR #2 block, 11, performs the following functions:

a. Stores blurred bracket-decode signals 117 in BBD register 131.

b. Stores delayed datastream 118 in NRD register 126 and eliminates from that register any data bits which become included in replies loaded into buffer storage 21 in the BUSEQ.

c. Compares, in NRD logic 128, NRD and BBD bit positions stored in registers 126 and 131. When NRD data bits are present which are not time-related to a following existing BBD, a nonrelated data present (NRDP) signal 129 is generated. NRDP signal 129 will be active whenever active bits are present which are not coincident with or following a later BBD at some multiple of 1.45 us. $+/-1$ clock. NRDP signal 129 is reclocked in latch 135 and sent to BUSEQ.

d. Bit adder 133 adds the number of BBDs to which a data bit possibly could be related, and outputs Single Bit Adder (SBA) signal 134 (when a bit position is active in two or more BBDs) to AND gate 142 where it is ANDed with the current reply BIT 120 from the input register and the ANDed output 123 is stored in MUB register 144. SBA 134 is also reclocked in latch 135 and sent to BUSEQ where it is used in the initial quality evaluation.

e. MUB logic 146 also generates a Trailing Bracket Decode (TBD) 148 for data bit positions A2 through S2 (See FIG. 8) when a possible trailing SPI pulse has been decoded. TBD reclocked in latch 151 and sent to the BUSEQ.

Referring to FIG. 3, BUSEQ performs the following functions:

a. Temporarily stores, in 170-bit analysis register 210, each reply being considered for loading into buffer storage 224.

b. Detects and temporarily stores SPI bit 120, and provides a 3-clock blurred signal 253 to allow for normal pulse time jitter and clocking variations relative to the F1 pulse.

c. Military emergency validation logic 252 receives F3-F4 (See FIG. 8) bracket decode (second train bit) 125, blurs it to 3-clock width, and stores it as BST 250 in selected buffer storage 224. During buffer storage time, military emergency validation logic 252 looks for F5-F6, then F7-F8 bracket decodes. If spacing is correct and consistent between all four framing pulse pairs, an Emergency Train Bit (BET) signal 251 will be included in the declared reply which is output on data bus 256.

d. Buffer select counter and logic circuit 246 sequences an unbusy buffer for reply storage and sets a busy flag for selected buffer 224.

e. Selected buffer 224 stores decoded replies (for up to 50.75 us.), including 13 data bits 218, SPI bit 253, second train bit (BST) input 250, military emergency train bit (BET) input 251, and two quality status bits 245, while military emergency validation and quality evaluation are taking place. In Mode 1 replies, where SPI function is activated by repeating both framing pulses of a normal reply train, BST output 258 is used for the SPI output bit.

f. Initial and final quality evaluations are performed on each reply, and quality status bits are entered as part of the loaded reply. (Quality status can be one of three states: clean, potentially garbled, or garbled.)
g. The quality evaluation logic circuit 244 compares quality status against required quality criteria 238 from the associated Reply Processor. If quality of the loaded reply meets or exceeds criteria, quality status 243 enables unload logic 235, via AND gate 237, to declare the reply for output on data bus 256. If reply quality status does not meet criteria, the stored reply is discarded.
h. Receives target start signal 239 from the associated Synchronizer chip when a valid new reply is in storage and hardware defruiting is enabled. If this signal is not received, the reply will be discarded. (Target start signal is used in conjunction with a range counter, not a part of the present invention, to determine the range from the interrogating station to the responding station.
i. After the quality evaluation and emergency train validation processes have been completed, unload logic 235 sequences buffer storage unloading of declared replies onto data bus 256, and simultaneously issues UNLOAD common signal 231 to alert the Reply Processor FIFO (or other type of interface buffers which will receive and queue declared replies).

NOTES:
1. Clock frequency assumed herein is 8.276 MHz for ATCRBS/SIF operation.
2. In the following paragraphs, elements of the invention which are shown functionally in FIGS. 2 and 3 will be alternately referred to in order to establish an understanding of the interrelationships and timing of signal events involved.

Referring to FIG. 2, the sum leading edge datastream 110 from the associated Leading Edge Detector is clocked into 209-bit input register 112. The 209-bit length was chosen to dynamically store a complete reply, plus any SPI pulse trailing an earlier reply, whereas the earlier reply is temporarily stored in the Buffer-Sequencer analysis register 210, FIG. 3.

The 170-bit length of the Buffer-Sequencer analysis register 210 accommodates both F1 and F2 framing pulses and all data pulses between them, including one bit for the F2 leading edge plus one bit to allow for jitter. First consider the process of decoding and loading a single, clean reply.

Referring to FIG. 3, the leading framing pulse, F1 of an ATCRBS/SIF reply will appear at end tap 219 of analysis register 210 (stage 170) while F2, because of jitter or allowable variations in pulse spacing and quantizing ambiguities, may appear at stages 1, 2 or 3 taps 211. Three-input OR gate 212 accommodates the +/−1-clock variation in F1-F2 spacing. All data taps 218 between F1 and F2 are also blurred +/−1 clock to ensure that all related bits will be decoded. AND gate 220 generates the 1-clock wide F1-F2 BD 221 which is ANDed in gate 222 with a 3-clock wide nonrelated data present (NRDP) flag 216 to load the decoded reply into an unbusy buffer 224 which has been selected by buffer select counter and logic 246.

Simultaneous or contiguous loading or unloading of two or more buffers cannot occur because successive bracket decodes are at least 2 clocks apart due to the action of the associated Leading Edge Detector, and because buffer select counter and logic 246 selects a single buffer at any one time. NRDP logic 215 also is inactivated once load occurs, so that one blurred NRDP bit cannot enable two loads separated by only one clock.

Loaded replies remain stored for up to 50.75 us. while final quality evaluation and military emergency train validation are completed. When a busy buffer 224 contains a valid reply which meets target start 239 and required quality criteria 238, and when interval timer logic 241 determines that it is time to unload data, unload logic 235 generates an UNLD signal 233 (and also clears the respective buffer busy flag). The UNLD signals from the ten buffers are combined in OR gate 232 to send UNLD COMMON 231 to the reply FIFO. Unloading can only occur at 50.75 us. after load (plus several clocks incurred for logic signal propagation) because of interval timer logic 241.

When an SPI pulse is present, it occurs nominally at 24.65 us. (204 clocks) after F1. Referring now to FIG. 2, the SPI bit 120 for a reply in register 210 is tapped off at tap SPI (173rd clock position) of input register 112 and is separately fed forward to the Buffer-Sequencer, where it is clocked into dedicated 3-bit register 255, FIG. 3. When present, SPI pulse will appear in one stage of 3-bit register 255, so that during one of these three clock tolerance periods, it will be coincident with F1-F2 BD 221. When SPI bit 253 is present in the loaded reply, interval timer logic 241 extends the garble check to cover F2, S1, and S2 bit positions.

NOTE: Some specifications for ATCRBS/SIF equipment would allow +/−0.1 us. tolerance of SPI from F2 position, but this tolerance would be cumulative with F2 tolerance from F1, or +/−0.2 us. for SPI with respect to F1. In this embodiment of the invention, SPI position is referenced from F1 with +/−1 clock tolerance, which also applies to F3 of a military emergency reply train.

Referring to FIG. 2, it will be seen that when military emergency train is present, AND gate 124 bracket-decodes F3-F4 pair from input register 112 contents. Military emergency validation logic 252, FIG. 3, blurs this F3-F4 BD over three clocks to ensure that it will be present at buffer load (F1-F2 BD) time. Military emergency validation logic 252 then checks whether each of the remaining two pairs of framing pulses is present and is in correct time alignment (24.65 us. +/−1 clock) to the preceding pair; if so, "emergency train bit" (BET) 251, which was previously set by F3-F4 BD, will be output on the data bus.

Referring again to FIG. 2, the processing several replies that are interleaved or overlapped, and the quality enhancement and evaluation features of the present invention will be described. Because non-related data must be present in order for any new reply to be loaded, quality is enhanced by loading only those replies which contain at least one bit which is unique; i.e., not included in previously loaded replies and which could not possibly be a bit of a later reply. Implementation of this nonrelated data concept reduces the number of replies to be stored in buffers and FIFO; equally important, it ensures against loss of unique data bits while working to minimize the total number of reply declarations and thus reduce the traffic burden on the Reply Processor.

The sum leading edge datastream propagating in input register 112 is tapped off at the 168th tap (118) and shifted into nonrelated data (NRD) register 126. Thus, the same datastream that will be propagating in analysis register 210 is also entered into NRD register 126. Use of this particular tap allows time for propagation in NRD register 126 and logic operation in NRD logic 128 so that NRD Present (129) bits will arrive in the Buffer-Sequencer at the same time that F1-F2 BD occurs in the analysis register 210 (FIG. 3). From these same F1-F2 BDs which cause replies to be loaded into selected buffer storage, a 3-clock wide transfer enable pulse, TEN 149, is returned from the Buffer-Sequencer to NRD register 126 where it inhibits propagation of any data bit present which is time-aligned $+/-1$ clock with buffer load 223. Thus, any data bit present in NRD register 126 which is time related to the reply being loaded will be deleted from NRD register 126. Other bits that belong to interleaved or closely spaced replies will remain in NRD register 126, as will also be the case in analysis register 210; but because analysis register 210 contents are loaded in parallel into buffer storage, only those data bits which are time-aligned $+/-1$ clock with reference to the current buffer load 223 will be loaded.

Any later reply, or any two pulses with 20.3 us. $+/-1$ clock spacing which follow a loaded reply, will cause blurred bracket decode logic 113 to generate a BBD 117. A 3-input OR gate 114 is used so that $+/-1$ clock variation in F1-F2 spacing is allowed. Actually, three OR gates 114 and three AND gates 116 are used, and tap 119 is actually 3 adjacent taps ORed together so that a 3-clock-wide blurred bracket decode (BBD) 117 is generated, but only one set of these elements is shown in FIG. 2 for clarity. Notice that BBD register 131 contains only 3-clock-wide BBDs—not data pulses.

NRD register 126 contents are tapped off every 12 stages (1.45 us. for ATCRBS/SIF) and applied to NRD logic 128 together with the corresponding bit positions from BBD storage register 131. As each 3-clock-wide BBD pulse propagates through BBD register 131, it makes each tap of register 126 active for 3 clocks at the correct times for all data bit time positions that could be associated with the F1-F2 pair from which that BBD was generated. NRD register taps 127 are spaced at 12-clock intervals i.e. at 1.45 us. intervals. There are 18 taps 127 to accommodate both framing pulses, 12 data pulses, X pulse, SPI pulse, and the two invalid spaces between F2 and SPI. (Notice that the SPI pulse position is the same as F3 position in the second pair of a military emergency reply).

NRD logic 128 is conventional combinational logic which compares the remaining 1-bit wide nonrelated data bits in NRD register 126 with BBDs present in BBD register 131. Only those NRD bits which are not coincident with, nor time-aligned within $+/-1$ clock of, a following BBD, will generate NRDP bits. In other words, if a later BD could possibly load a particular data bit from analysis register 210 datastream, then the replicate bit propagating in NRD register 126 would not produce an NRDP signal 129. If BBD register 131 contains a BBD coincidental with or earlier than (by some multiple of 1.45 us., $+/-1$ clock) a data bit being propagated in NRD register 126, it will be assumed that the data bit is related to this BBD, and no NRDP signal will be output. Conversely, if a data bit being propagated in NRD register 126 is not coincidental with or following a BBD at some multiple of 1.45 us. $+/-1$ clock (but not exceeding 20.3 us. $+/-1$ clock for a normal reply or 24.65 us. $+/-1$ clock for a SPI reply), it is assumed to be nonrelated, so it will generate an NRDP signal 129.

All taps on BBD register 131 are summed by bit adder 133. This tree of single-bit full adders activates SBA signal 134 if more than one BBD is present in BBD register 131 at some multiple of 1.45 us. $+/-1$ clock. This situation arises when a C2 data pulse/SPI BD occurs. It can also occur when two separate replies are overlapped or when there is a coincidental alignment of data bits at 20.3 us. $+/-1$ clock spacing. If two reply trains are closely spaced and separated by only 2 clocks, a data bit could be related to either reply, so both BBDs will be assumed to be related to it. Such closely spaced replies constitute a special case in quality evaluation, in which both replies which generated the BBDs will be stored with potentially garbled quality status.

Whenever two BBDs coexisting in BBD register 131 are time-aligned by some multiple of 1.45 us. $+/-2$ clocks, SBA signal 134 will go high every 12 clocks for 1 to 3 clocks, depending upon exact spacing between them. SBA signal 134 is latched in latch 135 and sent to quality evaluation logic 244, FIG. 3, where it is used in the initial quality evaluation of decoded replies.

SBA signal 134 is also ANDed in gate 142 with 1-bit-wide serial datastream 120 to generate Multiple-Use Bit (MUB) datastream 143, which consists of only those individual data pulses that are time-related to more than one BD. These MUBs are shifted into 206-bit MUB register 144, where they are entered into the third stage so that they will be in time alignment with F1-F2 BDs 221, intervals. MUB logic 146 is conventional combinational logic which output 1-clock-wide bits (MUB) 138, via latch 151, to quality evaluation logic 244, FIG. 3. MUB logic 146 also generates a Trailing Bracket Decode (TBD) signal 139 via latch 151 when a later blurred bracket decode exists at any blurred bit position between a C2 data pulse and SPI. When TBD output 139 is active, potentially garbled status will be established by quality evaluation logic 244, FIG. 3.

The MUB signal 138 is used in the initial quality evaluation of all cases except C2/SPI, because that special situation will generate MUBs for data bits A2 thru D4, if present. When a C2 bit 140 is present in a loaded reply, it is also latched in latch 151, FIG. 2, then the C2 latched output 141 is ANDed with blurred SPI position in MUB logic 146. If both bits are present, the normal MUB signal path within MUB logic 146 is disabled after bits F1, C1, and A1 are passed.

At the time when the reply under consideration is loaded into selected buffer 224, it will be loaded with quality status of potentially garbled. If the later reply is subsequently loaded into a buffer, (by virtue of having at least one nonrelated bit) it will be labeled garbled and the earlier reply will be downgraded to garbled status.

Timing of military emergency validation logic 252, quality evaluation logic 244, and unload logic 235 are all controlled and time sequenced by interval timer logic 241, which is clocked by the system clock 111 and synchronized to F1-F2 BD 221.

Figure 4:
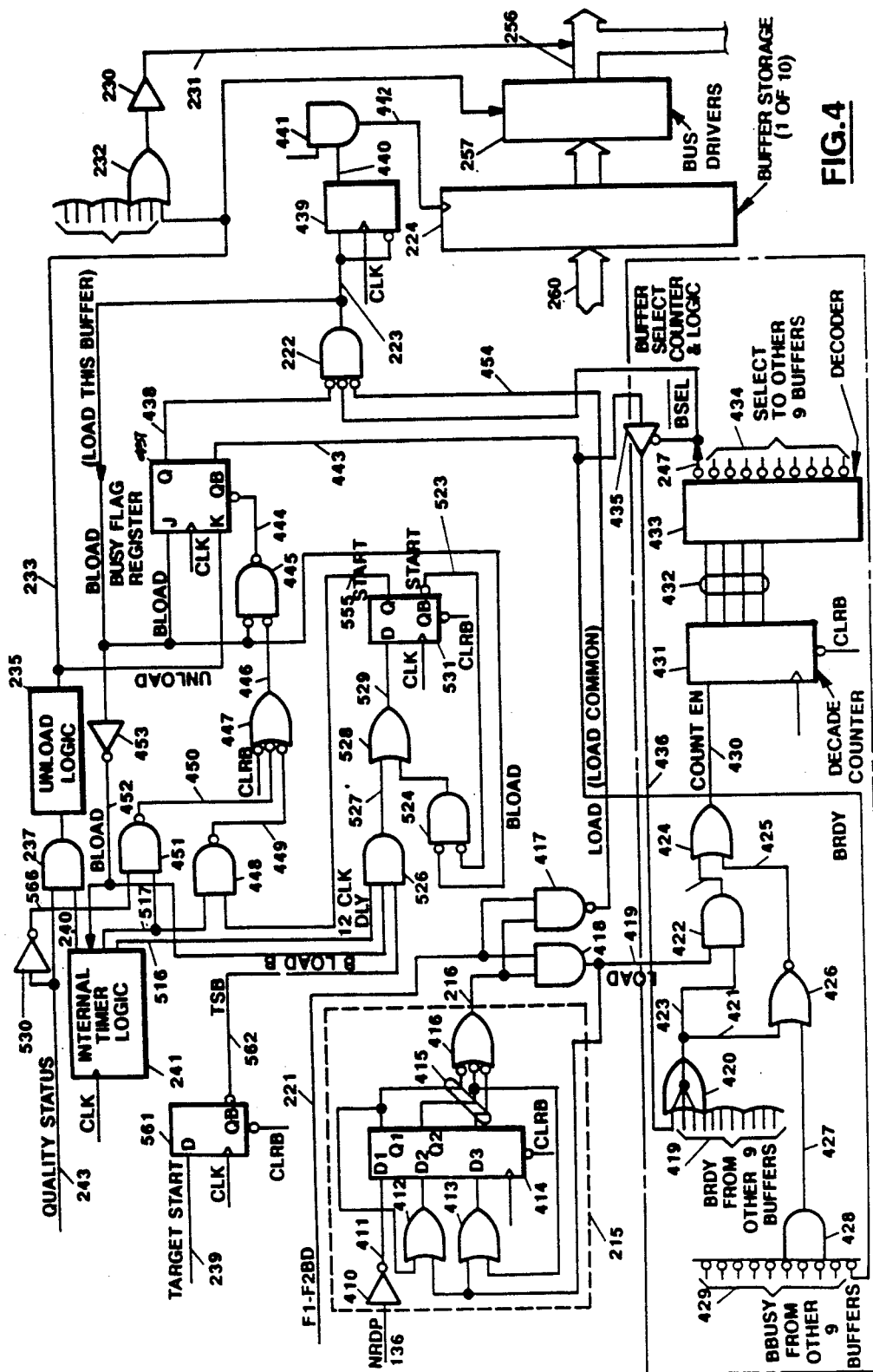
FIG. 4 is a logic diagram of the buffer select counter and logic circuit 246 shown in block form in FIGS. 1 and 3.

Moving on to FIG. 4, it will be seen that the buffer select counter and logic circuit 246 performs buffer selection and other functions which are common to all buffers. Decade counter 431 and 10-line decoder 433 sequence the 10 buffers until an unbusy one is found and loaded, then the next unbusy buffer is sequenced. In the situation where all buffers would contain replies that meet target start and required quality criteria, they would also be unloaded in the same time sequence in which they were loaded. However, when any reply fails to meet these criteria, the buffer busy register 437 is cleared, which effectively discards the reply and activates the buffer ready line (BRDY) 436 when the buffer select (BSELB) line 247 for that buffer is active. Buffers thus cleared are ready to accept data earlier than the normal 50.75 us. storage period, and will be sought out by the buffer select circuit.

Returning briefly to FIGS. 2 and 3, an F1 bit will arrive at the end of analysis register 210 just 2 clocks behind the replicate bit arrival at the end of NRD register 126. This allows time for NRDP signal 129 to be latched for one clock period in latch 135, then blurred to 3-clock width in NRDP logic 215 shown in detail in FIG. 4. There, inverter 410 enters a low into 3-bit register 414 one clock ahead of correct F1 alignment. This low propagating in register 414 and ORed in gate 416 will enable NAND gate 417 for a 3 clock period beginning one clock ahead correct F1-F2 BD position, so that F1-F2 BD will pass, if within +/−1 clock of correct position, to generate a low-active common load pulse, LOAD 454. Similarly, AND gate 418 produces a high common LOAD 419 which, passed by OR gates 412 and 413, applies logic highs to register 414 to terminate NRDP (blurred) 216 on the next clock. Thus, NRDP logic 215 allows only one load per blurred NRDP 216. LOAD 419 also enables decade counter 431 to increment, selecting the next non-busy buffer to be loaded with the next reply. In this manner, buffers are sequenced in numerical order until an unbusy one is found, and that buffer remains selected until it is loaded.

The particular buffer select line BSEL 247 applies a low to NAND gate 222 to generate the particular buffer load pulse, BLOAD 223, which then toggles latch 439 on for one clock period. AND gate 441 is then enabled and the next clock pulse will generate the load strobe 442. BSEL 247 also enables one of 10 drivers 435, the outputs of which are wire-ORed (420) to form the Buffer Ready (BRDY) line 421. BLOAD 223 also causes busy flag register 437 to be clocked on by the next following clock, thus setting BBUSY flag 438 high. Simultaneously, BBUSY 443 goes low to disable the particular BRDY line 436.

When a reply has been loaded for 24.65 us. (+2 clocks), interval timer logic 241 enables AND gates 448 and 451 (by placing a high on line 517) to detect either: unacceptable quality (when required quality criteria input 238 is used) or nonstart (when hardware defruiting is enabled by a setup input to the associated Synchronizer). If either condition is detected, busy flag register 437 is cleared by the low passed through NOR gate 447 and high-level NAND gate 445, thereby discontinuing processing, discarding the reply, and making the buffer available to accept a new reply. If neither unsatisfactory condition is detected, processing will continue for the full 50.75 us. period.

NOTES:
(1) Buffer storage of decoded replies is necessary to allow time for garble quality determination, i.e., whether the stored reply being evaluated is overlapped by a later reply. Garble is determined during the first reply frame (13 pulse intervals of 1.45 us. each) to allow for bit positions up to about not including F2 when SPI or a second train is not present, or 16 pulse intervals to cover F2, S1, and S2 positions when SPI or F3 is present. After that time it is no longer necessary or desirable to continue storing a reply which either does not meet externally established quality criteria, or which is nonstarted when hardware defruiting is enabled.

(2) Defruiting may be defined as being any process whereby False Replies Unsynchronized In Time (FRUIT) are eliminated. This process can be accomplished by correlation of replies returned during successive interrogations. In ATCRBS/SIF applications, target starts are usually done by Reply Processor software on the basis of either target reply range matching or target reply code-matching data bits contained in successive replies. Whenever the Reply Processor is engaged in software determination of target start/stop, whether on the code-matching basis or target-range-only basis, it is necessary for the BUSEQ chips to store all decoded replies and not to eliminate any of the nonstarted replies. FRUIT- generated bracket decodes generally will be nonstarted targets. In high-FRUIT environments, jamming protection is enhanced by hardware defruiting in the Reply Decoder on the basis of target range only. Hardware defruiting is enabled by the Reply Processor (or the user) via the setup bus input to the associated Synchronizer chip.

(3) Mode 4 replies, used for military purposes, contain no data pulses; so, target start by data matching can not be done and no advantage remains to using software defruiting in the Reply Processor. Rather, hardware defruiting using range correlation target starts can be accomplished very well in the Reply Decoder, and the Reply Processor can thus be unburdened appreciably.

Referring again to FIG. 4, interval timing logic 241, after a 12-clock delay, pre-enables AND gate 526 to detect start or non-start. This 12-clock delay time is necessary to allow time for the associated Synchronizer chip to make the target start/stop determination. TARGET START 239 from the Synchronizer chip is latched for one clock in latch 561 and then applied as TSB 562 to AND gate 526.

When the loaded reply is not started, TSB 562 will be high so that 12 clocks after buffer load, when 12-clock delay line 516 from interval timer 241 goes high, AND gate 526 will pass a high to latch 531 causing the Q output, NOT START 555, to be set high. NOT START 555 will then remain set high because of the low-active holding path which enables NAND gate 524. At the end of the first frame count (after D4 data bit position) timing line 517 goes high to enable NAND gate 448 which outputs a low through active-low NOR gate 447 and active-low NAND gate 445 to asynchronously clear busy flag register 437. Conversely, if TARGET START had been received from the associated Synchronizer, reply processing would be allowed to continue unless quality status did not meet the required quality criteria. Then, quality status 243 would be low, NAND gate 451 would be enabled by inverter 530, and the resulting low would clear busy flag register 437.

When a buffer has been loaded for 50.75 us., interval timer logic 241 activates line 240 to enable AND gate 237. Provided that quality status 243 is satisfactory (high), on the next following clock, unload logic 235 will generate UNLOAD 233 which enables the particular set of bus drivers 257 associated with selected buffer 224 to output data on the common output data bus 256. OR gate 232 passes this logic high and driver 230 activates UNLOAD COMMON line 231 which is forwarded with the data output via common data bus 256.

Referring again to FIG. 2, bit adder 133 monitors BBD register taps 132 to determine whether two or more BBDs are propagating in BBD register 131 which are time-aligned (at some multiple of 1.45 +/−1 clock) so that data bits of the reply under analysis could possibly be related to either. Data bits C1 through D4, when in multiple use, are contained in MUB 138, but SPI is not.

Figure 5:
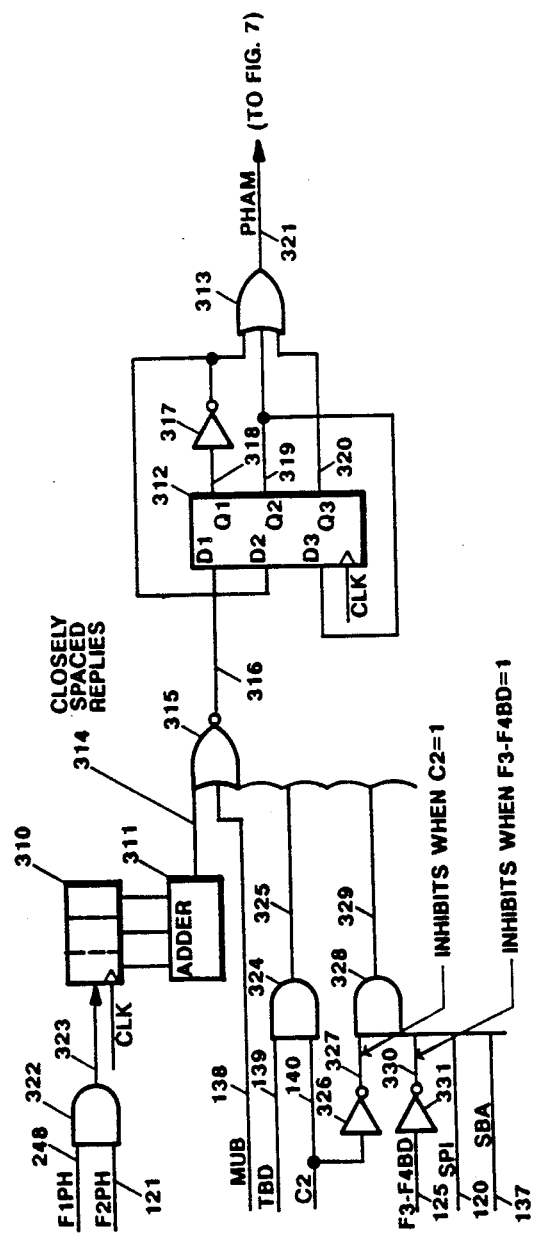
FIG. 5 is a diagram of the closely spaced bracket decode detection logic circuit included in the quality evaluation logic shown in block form in FIG. 3.

Quality evaluation logic 244 (FIG. 3) includes the closely spaced bracket decode logic shown in FIG. 5, to which reference is now made. Input SPI 120 is ANDed in gate 328 with SBA 137 (high when two or more BBDs are present in register 131) to establish potentially garbled quality status unless either: F3-F4 BD 125 of a potential military emergency train has been decoded, or Mode 1 SPI (which also generates F3-F4 BD) has been decoded, or a C2 data pulse 140 is present. C2/SPI bracket decode would generate MUBs for all bits after C2, so in this case, SBA is disabled by inverter 326, and the Trailing Bracket Decode (TBD) method is enabled by AND gate 324. Then, if a TBD is present at any blurred bit position from C2 to SPI, potentially garbled status is established.

$F_1PH$ signal 248 from the tap located at stage 166 of analysis register 210 and $F_2PH$ signal 121 from the ORed taps located at stages 204-206 of input register 112 are ANDed in gate 322. Any two pulses in the input data stream that are spaced apart by 20.3 us., +/−1 clock, will generate an output on line 323, which is entered in three-bit register 310. When more than one bit is present in register 310, two-bit adder 311 generates a high on line 314. Output on line 314 may establish potentially garbled status for any loaded reply when successive bracket decodes occur with insufficient spacing, as will shortly be known.

The four signals which can produce potentially garbled status are ORed in gate 315 and shifted, as a logic 0 at output 316, into 3-bit register 312. These input signals are: closely spaced F1-F2 phantoms 314, SPI 120, MUB 138, and TBD 139. OR gate 313 and register 312 provide a +/−1 clock blurred output, because if any bit(s) are present in register 312 at LOAD time, PHAM signal 321 will be high, resulting in potentially garbled status in the buffer being loaded.

Figure 6:
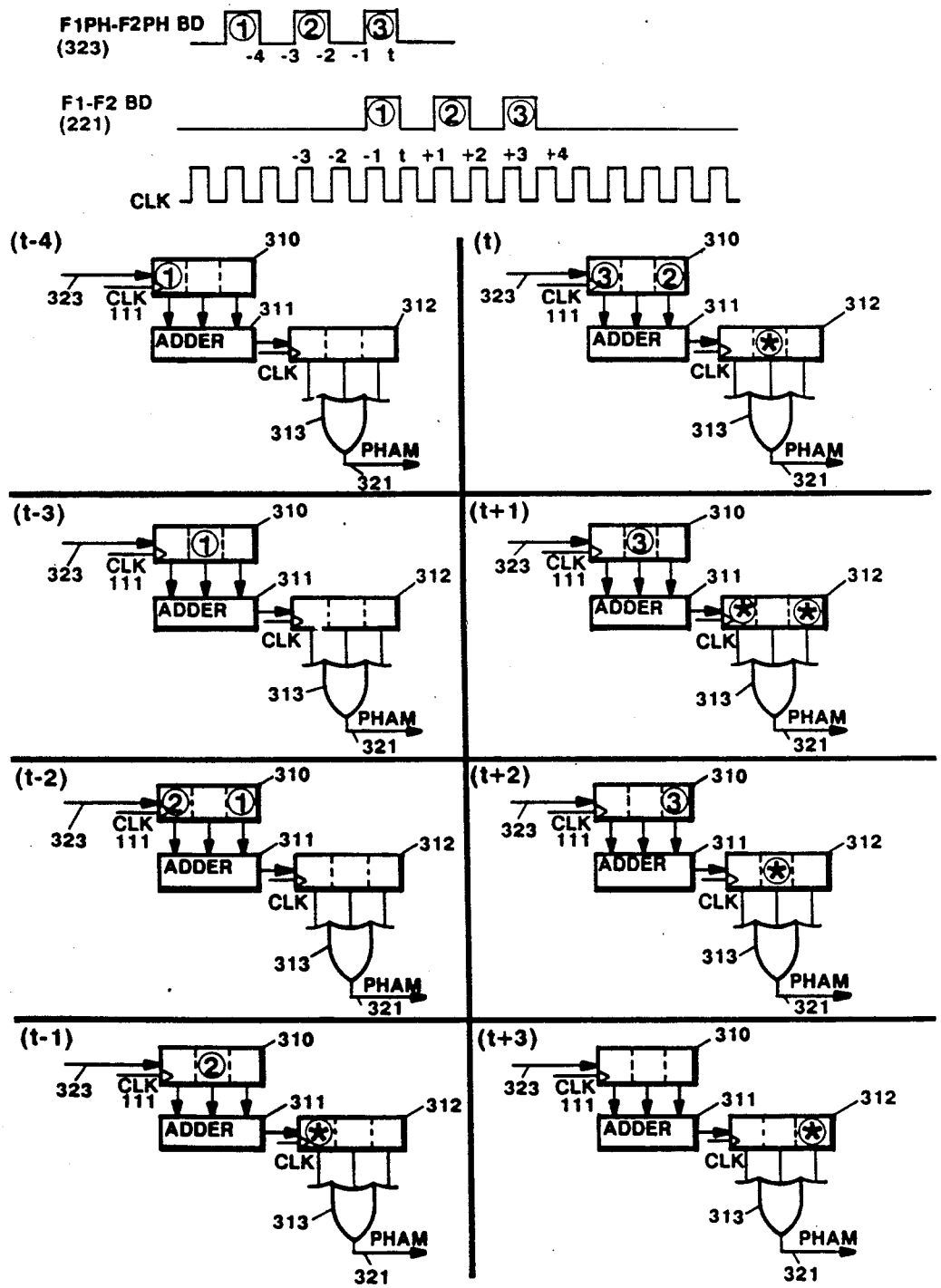
FIG. 6 is a diagram shown the operation of the circuit of FIG. 5.

FIG. 6 illustrates the operation of the circuit of FIG. 5 closely spaced replies are detected by single-bit adder 311 on the 3-bit phantom bracket decode register 310. $F_1PH$-$F_2PH$ bracket decodes 323 appear four clocks before $F_1$-$F_2$ bracket decodes 221 from register 210. Three successive BDs 323, #1, #2 and #3, separated from one another by one clock are shown. The buffer 224 selected for loading will be loaded on the clock following BD 221, pulse #1, at clock (t). At time (t−4) BD 323, pulse #1, is present and is loaded into the first stage of register 310. At (t−2) BD 323, pulse #1, is advanced to the third stage and pulse #2 is entered in the first stage of register 310. Adder 311 then generates an output which is entered in the first stage of register 312 at clock (t−1), producing, in turn, an active low output from gate 315. The low loaded into buffer at time (t) being downgraded to potentially garbled.

At time (t), register 310 contains both pulses #2 and #3 of BD 323 so that, at (t+1), register 312 contains bits in both its first and third stage. These bits will progress through register 312 and the second bit will be present in the third stage of register 312 at time (t+3) when load for BD 221, pulse #3, occurs. Thus, the third reply message will be loaded as potentially garbled.

In the present invention, three quality states are possible: clean, potentially garbled, and garbled. When a decoded reply is loaded into buffer storage, two quality bits are entered to indicate one of these three states. One but not both bits can be cleared. QS1 is forced low for potentially garbled status but QS2 is forced low for garbled. If both bits are set HIGH, status is clean.

Figure 7:
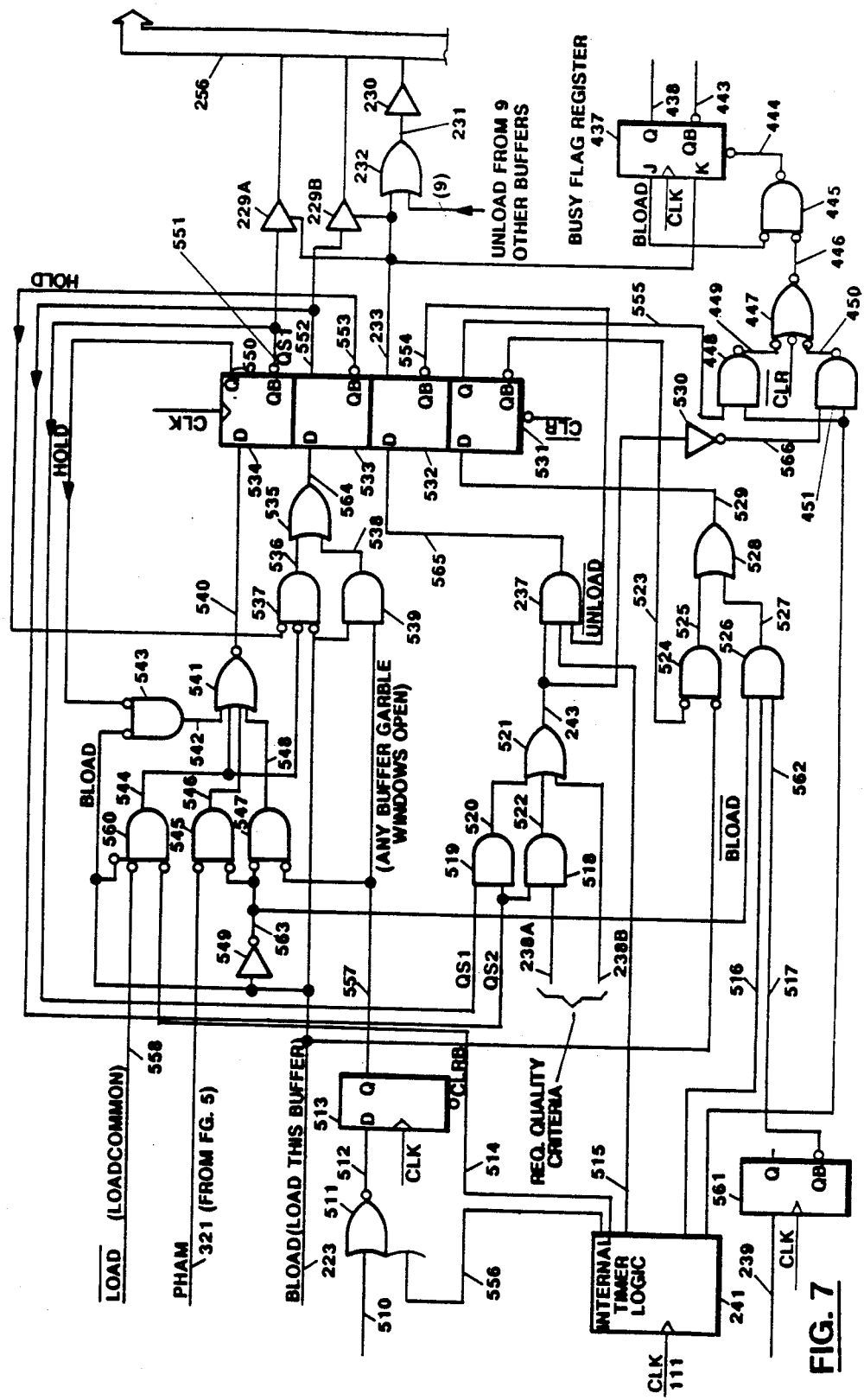
FIG. 7 is a logic diagram of the quality evaluation logic circuit.

Referring now to FIG. 7, if PHAM signal 321 is active (high) at buffer load time, NAND gate 545 output 546 is low, and NOR gate 541 enters a high into latch 534. QB output 551, which is the potentially garbled quality bit QS1, will then be low. Thus, in the initial quality evaluation, potentially garbled status will be established for the loaded reply when PHAM 321 is active.

Figure 8:
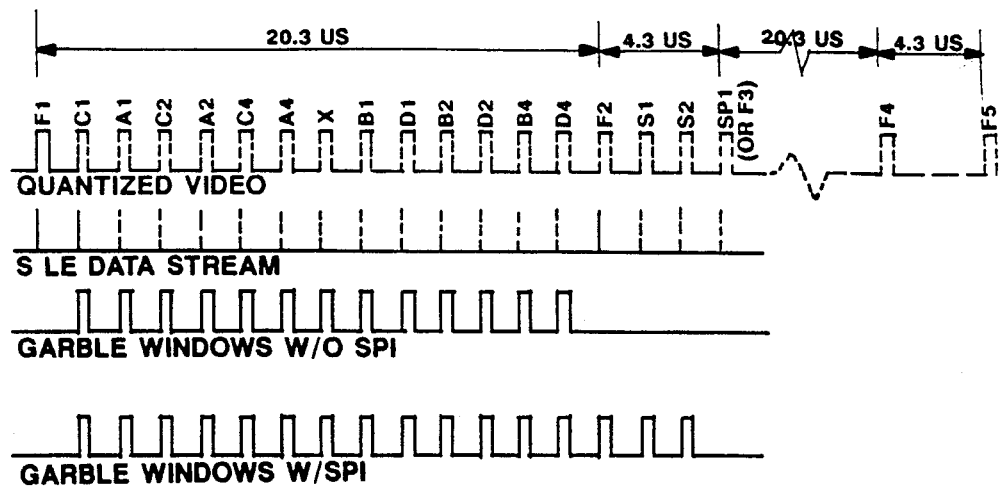
FIG. 8 is a timing diagram showing ATCRBS/SIF reply word format vs garble check windows.

Referring to FIG. 8, it will be seen that interval timer logic 241 generates 3-clock-wide garble windows 514 for each possible data bit position through D4 when SPI is not present, or through S2 position when SPI is present but F3-F4 is not present.

Referring again to FIG. 7, it will be seen that garble window gate lines 510 from other buffers are ORED and inverted by gate 511 and reclocked in latch 513 to form common garble window gate 557 for all other buffers. At buffer load time, BLOAD 223 will pre-enable AND gate 539; but if any previously loaded buffer has activated garble window gate line 510, AND gate 539 output 538 will be low. NAND gate 537 will be inhibited by BLOAD 223, so a low will be latched in flip-flop 533 on the next clock to make garble quality bit QS2 552 low. At the same time, NAND gate 547 will be enabled, causing NOR gate 541 to enter a low into latch 534; thus, potentially garbled quality bit QS1 551, because it is taken from the QB output of latch 534, will be high. As shown in the following quality status table, when QS2 is low, garbled status is established.

| Declared Reply Quality Status Table | | | |
|---|---|---|---|
| State | Weight | QS1 | QS2 |
| Clean | 3 | 1 | 1 |
| Potentially Garbled | 2 | 0 | 1 |
| Garbled | 1 | 1 | 0 |

It is important to understand that potentially garbled status in the initial evaluation can be downgraded to garble in the final evaluation, but potentially garbled status can never be upgraded to clean, neither can replies loaded as garbled be upgraded. Once the buffer has been loaded, NAND gate 543 forms a holding path to keep QS1 set (if it had been) while NAND gate 537 serves the same purpose for QS2. These paths are necessary because quality status bit registers 534 and 533 are continuously clocked. The garble windows decoded for all possible pulse positions of the current loaded reply pre-enable AND gate 560 to monitor the common LOADB signal 558. Then, if any other buffer is subsequently loaded through an open garble window of this buffer, NAND gate 560 breaks the NAND gate 537 holding path and clears QS2. Simultaneously, NAND gate 560 sets QS1 (through OR gate 41.)

During the first data frame (18.85 microseconds) following buffer load, interval timer logic 241 enables internal garble window line 514 one clock later than external garble window line 556 to compensate for the 1-clock delay incurred in garble register 513. Referring again to FIG. 8, it will be seen that this action is repeated for the 13 data bit positions of the first frame when SPI is not present, but 16 positions when SPI is present in the stored reply.

Figure 9:
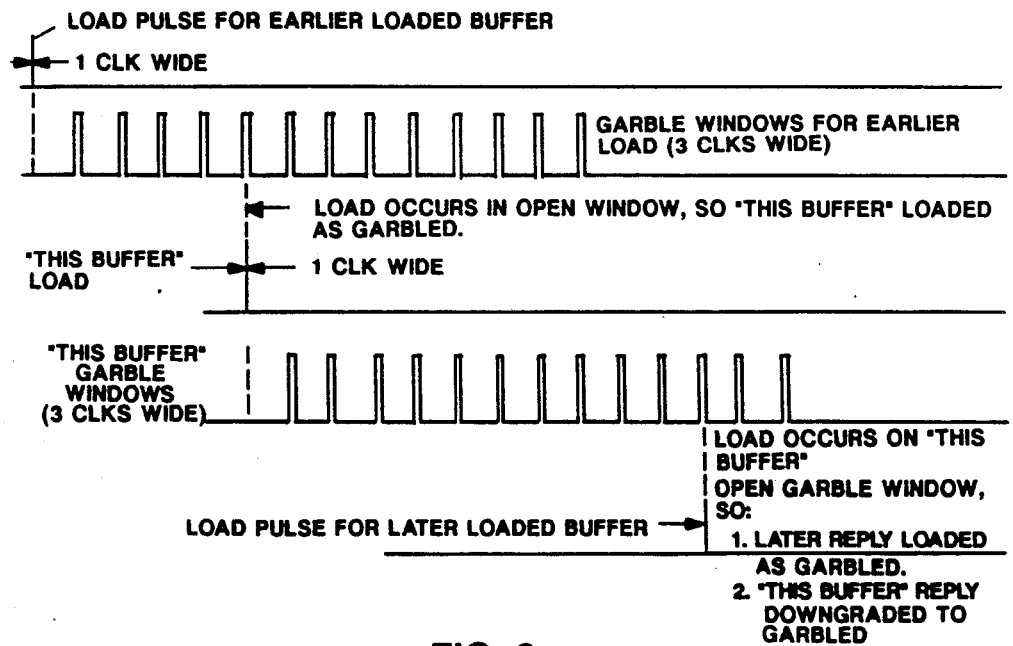
FIG. 9 is a timing diagram of the garble check process.

Referring to FIG. 9, this garble check timing diagram shows the garble windows for other buffers and the internal garble windows generated by interval timer logic 241 for the newly loaded buffer. If any late reply were to generate a LOAD signal (in the logic circuits dedicated to the respective buffer into which it will be loaded) in time coincidence with any open internal garble window, QS2 for the new reply would be forced low as also would QS2 for the earlier reply.

Figure 10:
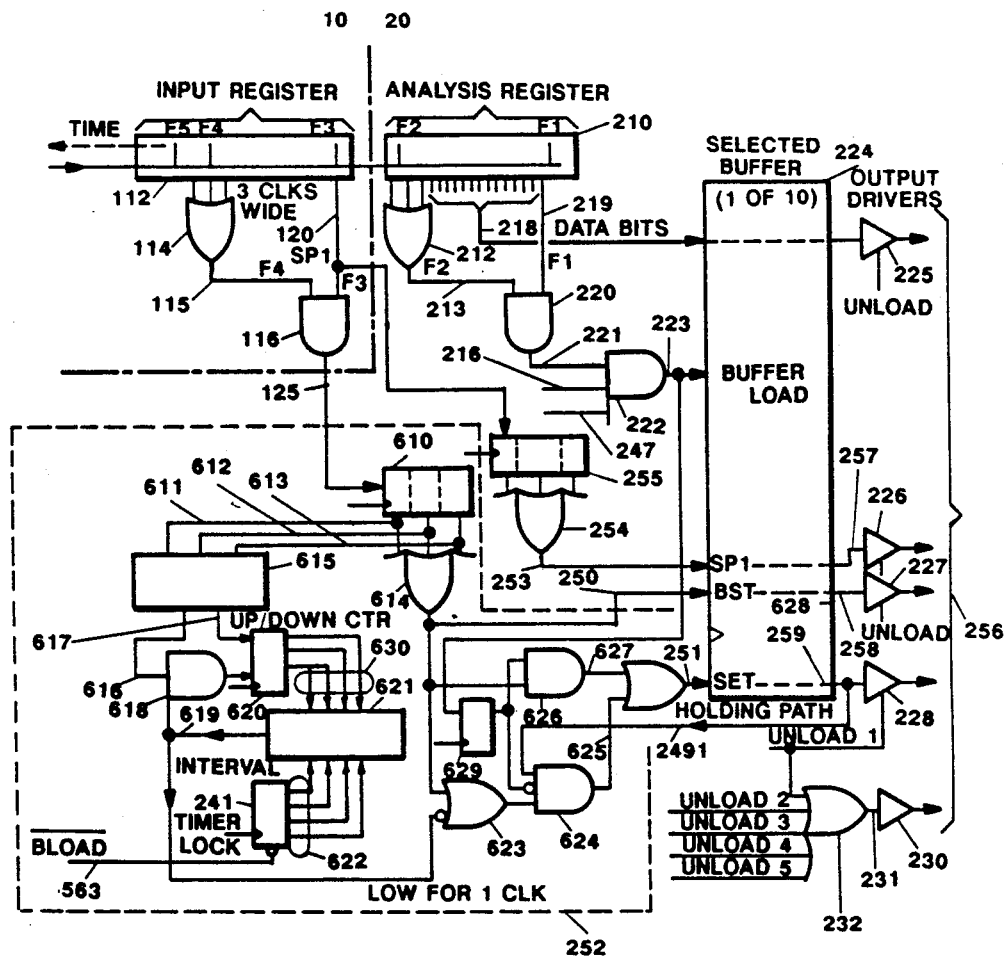
FIG. 10 is a simplified logic diagram of the second train, SPI, and emergency train decoding and validation circuits.

Referring now to FIG. 10, when a military emergency train is present, F3-F4 BD 125 will be shifted into ET register 610 in coincidence with F1-F2 BD 221. ET register 610 contents are decoded by OR gate 614 and OR gate 623. As long as an ET bit is present in ET register 610, second train bit BST input 250 to the buffer will be true; it will be loaded along with the other data bits at buffer load time, and will not be updated. BST input 250 is also ANDed with BLOAD in gate 626 to initially set the emergency train bit (BET) 251 by means of clocked latch 628. Once set (true), the holding path through AND gate 624 keeps clocked latch 628 set, unless the F5-F6 BD does not occur during the 3-clock window around the period where 619 gives high for 1 clock period; then OR gate 623 will disable AND gate 624 to break the holding path and thus clear BET 259. If the third and fourth framing pulse pairs, F5-F6 BD and F7-F8 BD, arrive at correct times, BET 259 will remain set. Because pulse interval count 622 increments continuously throughout the storage period, a means is required to adjust the look window for the next following ETBD based upon measured separation between previous ETBDs. This is achieved by up/down counter 620, which establishes the comparison magnitude 630 against which the pulse interval count 622 is matched. If MATCH occurs while ETBD is present in ET register 610 (as it will be if spacing is 204 +/−1 clock), the holding path will not be broken and BET latch 628 will therefore remain set.

F3-F4 BD is ANDed in gate 626 with buffer load (BLOAD), which occurs 1 clock after the buffer is actually loaded by LOADB (because of the delay by latch 629) then latched into 628. This path is used for the second train (F3-F4 BD) only; for the third and fourth trains, BST input 250 will pass through OR gate 623 and AND gate 624 to latch 628—provided that they follow the leading framing pulse of the preceding pair by 24.65 us. +/−1 clock.

The second train (F3-F4 BD) must have arrived at the correct time in order to enable AND gate 623 for the F5-F6 BD, and then that BD must be correct for AND gate 623 to remain enabled to pass F7-F8 BD. Thus, all four framing pulse pairs must have been present at the correct, blurred positions. At UNLD time, when buffer contents are strobed into the FIFO, driver 228 is enabled to pass the ET bit.

To establish the correct bracket decode window for each following pair, up/down counter 620 provides a static but adjustable count (630) based upon separation between leading pulses of the two previous pairs. Up/down count 630 is compared in a conventional magnitude comparator 621 against the incrementing pulse interval count 622. Pulse interval count 622 is a 4-bit magnitude while up/down counter 620 is a 3-bit device. The MSB of up/down count is compared against both the MSB and NOT MSB of the pulse counter; so in effect, a count of 8 is added to up/down count 630.

BLOAD clears interval timer logic 241 and presets up/down counter 610 on the first clock following buffer load. If the leading framing pulse of the new pair occurs exactly 24.65 us. after the leading pulse of the preceding pair, the new ET bit will appear in the center stage of ET register 610 (due to the 1-clock delay by latch 629). In this case, up/down count 630 will not be changed because stages 1 and 3 of ET register 610 are decoded by position decoder gates 615 to form ETCT 616. When the ET bit is in stage 2, ETCT 616 will be low and up/down counter 620 will be inhibited. When the ET bit is in stage 2, ETCT and ETUP will both be low; so, BLOAD will preset up/down counter 620 to a count of 7, which count translates to 15 on magnitude comparator 621.

If the new BD is 1 clock late, it will appear in stage 1 of ET shift register 620, activating ETUP 617 to preset up/down counter 620 to count 0 (=8 in octal), which translates to 16 in magnitude comparator 621. If the new BD is 1 clock early, ETUP 617 will be low to set up/down counter 620 mode to down and will load a count of 6, which count translates to 14 on magnitude comparator 621. The second train will thus preset up/down counter 620 to represent time between leading edges of F1 and F3.

Figure 11:
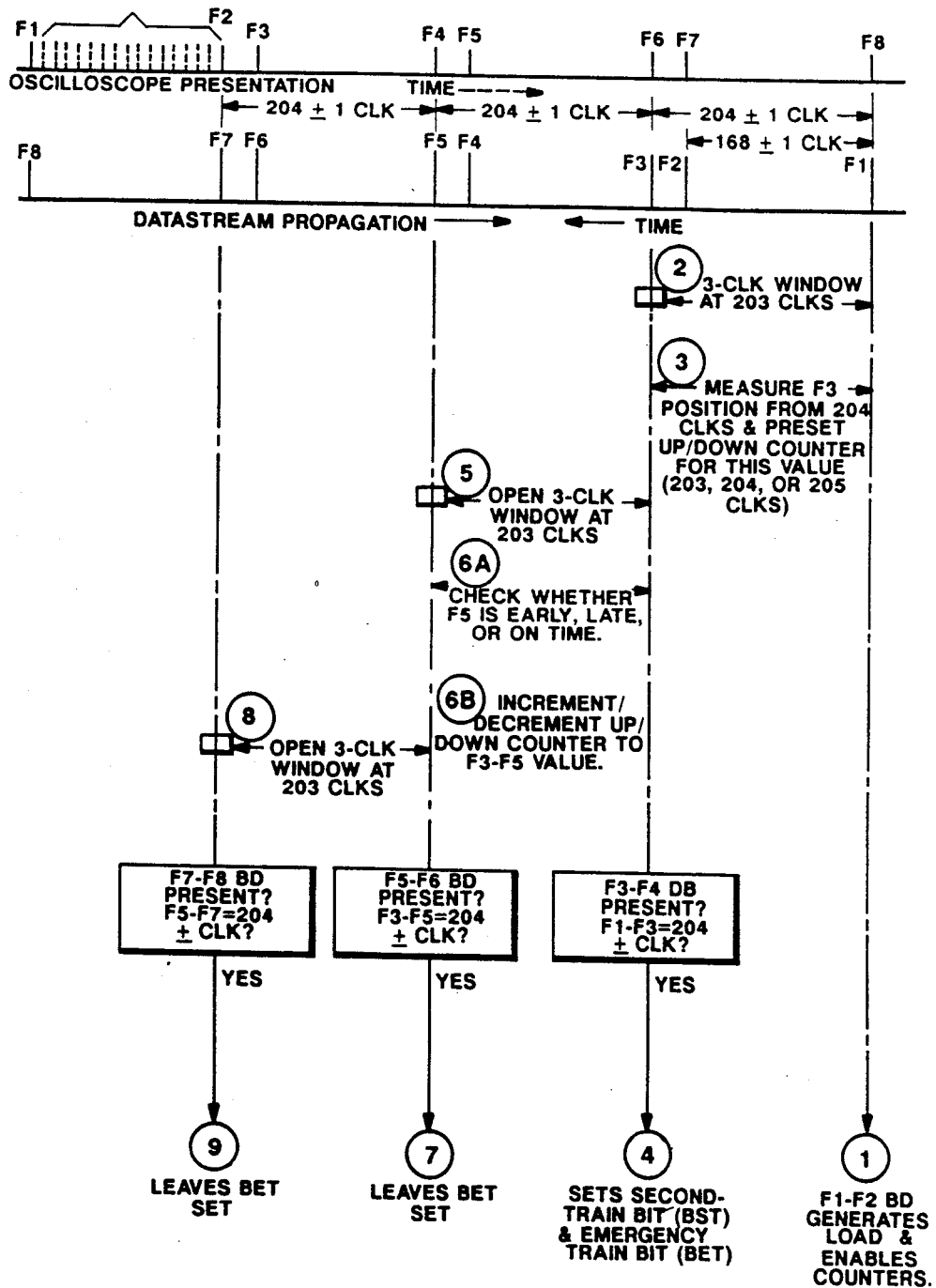
FIG. 11 shows timing and flow of the emergency train validation process.

While the second train bit adjusts up/down count 630 to the F1-F3 separation, separation between F3 and F5, and F5 and F7, if early or late, will enable up/down counter 620 to increment or decrement as shown in the table below. Thus, the ET window is kept centered relative to the last measured bracket decode, so that the window is open at the correct blurred position for the next expected bracket decode. This method is clearly superior to the alternative of allowing for cumulative inaccuracies over the four pulse trains. The logic and timing of this process is shown in FIG. 11.

| ET Window Control Logic Table ||||||
| ET Timing ||| Counter Control Signals ||  |
| t + 2 | t + 1 | t | ETUP | ETCT | Comments |
|---|---|---|---|---|---|
| 0 | 0 | 0 | 0 | 0 | Hold |
| 0 | 0 | 1 | 0 | 1 | Count down |
| 0 | 1 | 0 | 0 | 0 | Hold |
| 0 | 1 | 1 | 0 | 0 | Hold* |
| 1 | 0 | 0 | 1 | 1 | Count up |
| 1 | 0 | 1 | 0 | 0 | Hold |
| 1 | 1 | 0 | 0 | 0 | Hold* |
| 1 | 1 | 1 | 0 | 0 | Hold* |

NOTE: Present implementation of the associated Leading Edge Detector (LED) disallows contiguous reply pulses; so, *-noted situations cannot exist. Were the LED to be changed for some future application to allow contiguous pulses, ET window logic would hold existing count when two contiguous bits are present in the register. Hold state effectively gives priority to the center bit, because it will be the stage which is the expected position for the BD.

In the preferred embodiment described above, military emergency trains cause three extra replies to be declared to the associated Reply Processor, and Mode 1 SPI causes one extra reply. Such extra declarations are not a serious problem for the Reply Processor, and an alternate embodiment can be used to eliminate them by including the additional replies in the non-related data register. The preferred embodiment does not incorporate the additional reply trains in the non-related data so as to allow the Reply Processor maximum flexibility for reply consideration.

The scheme considered was to treat military emergency BDs and Mode 1 SPI BDs and data bits as related data, thus eliminating their declaration as separate replies. One method of accomplishing this scheme would be to hold such replies in buffer storage for up to 94.25 us.; obviously, this approach would require twice as many storage buffer elements. Another method of eliminating such redundant declarations would be to incorporate shift register memory of declared replies, and then to inhibit reply declaration for the trailing BDs. This could be done in several ways: a 100-us. long shift register could be used with 3 taps spaced at 24.65 us. intervals to inhibit spurious replies; or, an interval timer could be used to generate inhibit pulses at 24.65 us. intervals.

THE INVENTION CLAIMED IS:

1. A decoder for separating pulse coded messages from a serial pulse stream composed of variably spaced pulses of uniform width, said messages being identified by first and second pulses of said stream which are separated by a first predetermined amount of time and containing information pulses which are spaced between said first and second pulses by integral multiples of a second predetermined amount of time, comprising:

a first serial storage means having an input terminal receiving said serial pulse stream and propagating said stream forward towards an output terminal thereof;

a second serial storage means having an input terminal receiving the pulse stream from said output terminal of said first storage means and propagating the stream forward;

a third serial storage means having an input terminal at which the pulses of said stream propagating through said first storage means are applied prior to the appearance of such pulses at said output terminal of said first storage means, said third storage means propagating forward the pulse stream applied to said input terminal thereof;

a plurality of buffer storage means;

means for detecting the presence in said second storage means of first and second pulses having said first predetermined time spacing therebetween to provide a first bracket decode signal;

means for providing parallel output of all pulses contained in said second storage means having spacings from said first and second detected pulses which are integral multiples of said second predetermined amount of time, said output pulses comprising a message;

means controlled by said first bracket decode signal to enable the loading of one of said buffer storage devices with said message provided by said parallel output means; and means for deleting from said third storage device all pulses therein which correspond to pulses provided by said parallel output means.

2. A decoder as claimed in claim 1 wherein said parallel output means supply successive messages to separate ones of said buffer storage devices, said buffer storage devices retaining said messages stored therein according to their relative times of reception.

3. A decoder as claimed in claim 2, with additionally:

means for detecting the presence in said first storage means of each pair of pulses having said first predetermined time spacing there between and for providing a second bracket decode signal at the time of said detection in said first storage means;

a fourth serial storage means for storing said second bracket decode signals in accordance with the relative times of appearance of said second bracket decode signals; and means for detecting the presence in said fourth storage means two or more signals having time spacings there between which are integral multiples of said second predetermined amount of time to provide a first quality signal indicating that any message associated with said second bracket decode signals is potentially garbled.

4. A decoder as claimed in claim 2 wherein:

said means for selecting and enabling the loading of one of said buffer storage devices is adapted to select and enable the loading of a second one of said buffers only if said third storage means contains pulses.

5. A decoder as claimed in claim 2, with additionally:

means for determining whether any of the pulses contained in said third means are time related to any of the pulses contained in a message loaded into one of said buffer storage devices such that the time spacing between any pulses of said loaded message and any pulses of said third storage means is an integral multiple of said second predetermined amount, and for providing a second quality signal indicating that said message contained in said buffer storage device is garbled.

6. A decoder as claimed in claim 2, with additionally:

means for detecting the presence of a third pulse in said second storage means and a fourth pulse in said first storage means having said first predetermined spacing there between to provide a phantom bracket decode signal, said phantom bracket decode signal being generated prior to the generation of a said first bracket decode signal when the same said third and fourth pulses are present in said second storage means; and means providing a third quality signal indicating that the message associated with said first bracket decode signal generated by said same third and fourth pulses is potentially garbled.

7. A decoder as claimed in claim 2, with additionally:

means for temporarily storing said phantom bracket decode signals; and means responsive to a time spacing between successive phantom bracket decode signals which is equal to the width of one of said pulses of said serial pulse stream to provide a fifth quality signal indicating that the message associated with a said first bracket decode signal later generated by the same pulse pair which caused the generation of the first of said successive phantom bracket decode signals is potentially garbled.

8. A decoder for decoding a pulse code modulated message contained in an input serial stream of pulses of uniform width, said message being identified by a first framing pulse $F_1$ and a second framing pulse $F_2$ said $F_1$ and said $F_2$ pulses being separated by an interval of 20.3 microseconds, and containing one or more information pulses spaced between said $F_1$ and $F_2$ pulses at intervals which are integral multiples of 1.45 microseconds, said input stream of pulses possibly being composed of pulses associated with different ones of said messages, said decoder comprising:

a source of clock signals;

an input serial shift register receiving said input pulse stream and propagating said stream along the length of said input register at a rate determined by the frequency of said clock signals;

an analysis shift register receiving as its input the serial pulse stream propagated through the length of said input register and further propagating said input stream at a rate determined by the frequency of said clock signals, said input register having first bracket decode output tap proximate the input register output end and a second bracket decode output tap proximate the input end thereof, said first and second output taps being spaced apart a distance corresponding to 20.3 microseconds and a third output tap spaced ahead of said first output tap thereof providing output pulses corresponding to the pulses being propagated through said input register;

first bracket decode logic means associated with said first and second bracket decode output taps whereby any two pulses propagating in said input register and having a spacing of 20.3 microseconds will cause said logic means to generate a first bracket decode signal when said two pulses are present simultaneously at said first and second output taps;

said analysis register having a fourth bracket decode output tap proximate the output end thereof and a fifth bracket decode output tap proximate the input end thereof, said fourth and fifth bracket decode output taps being spaced apart a distance corresponding to 20.3 microseconds, and a plurality of data output taps spaced apart from one another and from said fourth and fifth bracket decode taps at distances corresponding to 1.45 microseconds;

second bracket decode logic means associated with said fourth an fifth bracket decode output taps whereby any two pulse propagating in said analysis register and having a spacing of 20.3 microseconds will cause said second logic means to generate a second bracket decode signal when said two pulses are present simultaneously at said fourth and fifth bracket decode output taps;

a non-related data shift register receiving said output pulses from said third tap of said input register and propagating said third output tap pulses at a rate determined by the frequency of said clock signals;

a plurality of buffer storage devices;

means for selecting and enabling the loading of an unbusy one of said storage devices;

means controlled by said second bracket decode signal for transferring to said buffer storage device in parallel-by-bit format pulses present at said data output taps of said analysis register upon the appearance of said second bracket decode signal; and, means for deleting from said non-related register any pulses corresponding to those pulses transferred to said selected storage device.

9. A decoder as claimed in claim 8 wherein:
said means for selecting and enabling the loading of an unbusy one of said storage devices is responsive to the presence of pulses in said non-related data register so as to enable loading only if pulses are present in said non-related data register.

10. A decoder as claimed in claim 8 wherein said buffer storage devices are adapted to retain the information stored therein for at least as long as twice the length of one of said messages, further including:

means for comparing the time relationship between an earlier received one of said messages and a later received one of said messages to determine whether any of the information pulses contained in either of said messages can be associated with both said messages and for providing a signal indicating the degree of quality of both said earlier message and said later message.

11. A decoder as claimed in claim 10 wherein said comparing means includes:
a bracket decode shift register for propagating successive ones of said first bracket decode signals at a rate determined by the frequency of said clock signals; and means for determining whether any of said signals propagating in said bracket decode register are spaced apart by times which are integral multiples of 1.45 microseconds.

12. A decoder as claimed in claim 10 wherein said comparing means includes:
a sixth output tap on said analysis register spaced ahead of said first output tap thereon;

a seventh output tap on said input register spaced ahead of the output end thereof;

said sixth and seventh output taps being spaced apart by intervening stages of said input register and said analysis register which combine to provide a spacing between said sixth and seventh output taps corresponding to 20.3 microseconds;

means for detecting the simultaneous presence of pulses at said sixth and seventh output taps to provide a phantom bracket decode output signal at a time prior to the generation of a said second bracket decode signal by those same pulses; and means responsive to a time spacing between two of said phantom bracket decode output signals which is equal to one clock period, to provide a signal indicating a degraded quality for each message later identified by successive ones of said second bracket decode signals resulting from the same pulse pairs which caused the generation of said two phantom bracket decode output signals.

13. A decoder for use in a communications system of the pulse code modulation type, said system including a receiver, a video detector for pulse signals received by said receiver and a leading edge detector for reforming the pulse output of said video detector into a stream of pulses of uniform width, the leading edges of the pulses of said stream corresponding in time to the leading edges of the output pulses of said video detector;

the pulses of the output of said video detector having a nominal width of 0.45 microseconds, said message being identified in said pulse stream from said leading edge detector by a first framing pulse $F_1$ and a second framing pulse $F_2$, said $F_1$ and said $F_2$ pulses being separated by an interval of 20.3 microseconds, and containing one or more information pulses spaced between said $F_1$ and $F_2$ pulses at intervals which are integral multiples of 1.45 microseconds, said stream of pulses from said leading edge detector possibly being including of pulses associated with different ones of said messages;

said decoder receiving as an input the pulse stream from said leading edge detector and separating said messages contained therein, said decoder comprising:

a clock oscillator providing clock signals having a period substantially equal to the width of the pulse output of said leading edge detector;

an input serial shift register receiving said input pulse stream and propagating said stream along the length of said input register at a rate determined by the frequency of said clock signals;

an analysis shift register receiving as its input the serial pulse stream propagated through the length of said input register and further propagating said input stream at a rate determined by the frequency of said clock signals, said input register having a first output tap proximate the input register output end and a second output tap proximate the input end thereof, said first and second output taps being spaced apart a distance corresponding to 20.3 microseconds, and a third output tap spaced ahead of said first output tap thereof providing output pulses corresponding to the pulses being propagated through said input register;

first bracket decode logic means associated with said first and second output taps whereby any two pulses propagating in said input register and having a spacing of 20.3 microseconds will cause said logic means to generate a first bracket decode signal when said two pulses are present simultaneously at said first and second output taps;

said analysis register having a fourth bracket decode output tap proximate the output end thereof and a fifth bracket decode output approximate the input end thereof, said fourth and fifth bracket decode output taps being spaced apart a distance corresponding to 20.3 microseconds, and a plurality of data output taps spaced apart from one another and from said fourth and fifth decode taps at distances corresponding to 1.45 microseconds;

second bracket decode logic means associated with said fourth and fifth bracket decode output taps whereby any two pulse propagating in said analysis register and having a spacing of 20.3 microseconds will cause said second logic means to generate a second bracket decode signal when said two pulses are present simultaneously at said fourth and fifth bracket decode output taps;

a non-related data shift register receiving said output pulses from said third tap of said input register and propagating said third output tap pulses at a rate determined by the frequency of said clock signals;

a plurality of buffer storage devices;

means for selecting and enabling the loading of an unbusy one of said storage devices;

means controlled by said second bracket decode signal for transferring to said buffer storage device in parallel-by-bit format pulses present at said data output taps of said analysis register upon the appearance of said second bracket decode signal; and, means for deleting from said non-related register any pulses corresponding to those pulses transferred to said selected storage device.

14. A decoder as claimed in claim 13 wherein said clock oscillator produces clock signals having a period substantially equal to 0.12 microseconds.

15. A decoder as claimed in claim 14, wherein said first bracket decode means and said second bracket decode means each include:

means for detecting pulse pairs which are separated by 20.3 microseconds, plus or minus a time equal to one period of said clock signals.

16. A decoder as claimed in claim 15 wherein said means for transferring data pulses from said analysis register to said buffer storage device comprises:

a plurality of groups of output taps on said register, said groups each including three successive output taps spaced apart at intervals equal to one period of said clock signals, the center taps of each said group being spaced apart along the length of said analysis register at distances corresponding to 1.45 microseconds.

17. A decoder as claimed in claim 16, wherein said buffer storage devices are adapted to retain the information stored therein for at least as long as twice the length of one of said messages, further including:

means for comparing the time relationship between an earlier received one of said messages and a later received one of said messages to determine whether any of the information pulses contained in either of said messages can be associated with both said messages and for providing a signal indicating the degree of quality of both said earlier message and said later message.

18. A decoder as claimed in claim 17 wherein said comparing means includes:

means for determining whether any of the information pulses contained in said earlier received message correspond in time with the information pulses contained in said later received message within plus or minus a time equal to one period of said clock signals.

* * * * *